(12) United States Patent
Ike et al.

(10) Patent No.: US 8,323,139 B2
(45) Date of Patent: Dec. 4, 2012

(54) VEHICLE DRIVE DEVICE

(75) Inventors: Nobukazu Ike, Kariya (JP); Yasunari Muranaka, Okazaki (JP); Takeshi Fukuma, Nishio (JP); Shinichiro Iga, Anjo (JP); Shingo Uozumi, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 600 days.

(21) Appl. No.: 12/588,495

(22) Filed: Oct. 16, 2009

(65) Prior Publication Data

US 2010/0151993 A1 Jun. 17, 2010

(30) Foreign Application Priority Data

Dec. 16, 2008 (JP) ................................ 2008-319705

(51) Int. Cl.
*F16H 61/26* (2006.01)
(52) U.S. Cl. ........................................................ 475/159
(58) Field of Classification Search .................. 475/159, 475/160; 184/6.12; 74/606 R, 606 A
See application file for complete search history.

(56) References Cited

U.S. PATENT DOCUMENTS

| | | | |
|---|---|---|---|
| 6,253,137 B1 | 6/2001 | Abo et al. | |
| 7,232,402 B2 * | 6/2007 | Tryon et al. | 477/5 |
| 2005/0205382 A1 | 9/2005 | Tryon et al. | |
| 2010/0242669 A1 * | 9/2010 | Komizo et al. | 74/606 R |
| 2012/0011961 A1 * | 1/2012 | Frait et al. | 74/606 R |

FOREIGN PATENT DOCUMENTS

| | | |
|---|---|---|
| JP | A 06-193711 | 7/1994 |
| JP | U 07-028261 | 5/1995 |
| JP | A 11-189073 | 7/1999 |
| JP | A-2000-190749 | 7/2000 |
| JP | A-2002-54724 | 2/2002 |
| JP | A 2002-054727 | 2/2002 |

OTHER PUBLICATIONS

International Search Report dated Jan. 19, 2010 for PCT/JP2009/069113.

* cited by examiner

*Primary Examiner* — Justin Holmes
*Assistant Examiner* — David J Hlavka
(74) *Attorney, Agent, or Firm* — Oliff & Berridge, PLC

(57) ABSTRACT

A vehicle drive device includes a case with a case main body portion accommodating the speed change mechanism, and a connection case portion connecting the engine and the case main body portion and having a diameter increased toward the engine; a hydraulic pressure control device that is provided under the speed change mechanism, and controls a hydraulic pressure to be supplied to the speed change mechanism; and an electric pump that generates the hydraulic pressure to be supplied to the speed change mechanism through the hydraulic pressure control device.

17 Claims, 6 Drawing Sheets

VEHICLE DRIVE DEVICE

CROSS-REFERENCE TO RELATED APPLICATION

The disclosure of Japanese Patent Application No. 2008-319705 filed on Dec. 16, 2008 including the specification, drawings and abstract is incorporated herein by reference in its entirety.

BACKGROUND

The present invention relates to a vehicle drive device which includes a hydraulically operated speed change mechanism, is connected to an engine for use, and includes an electric pump that generates a hydraulic pressure to be supplied to the speed change mechanism.

In recent years, an increasing number of vehicles have an idling stop function to stop an engine when the vehicle is stopped, in order to reduce fuel consumption and exhaust emission. Moreover, hybrid vehicles having an engine and a rotating electrical machine as a driving force source generally have a function to stop the engine when the vehicle is stopped or when the vehicle is decelerated. In vehicles including a hydraulically operated speed change mechanism, however, a mechanical pump, which is driven by an engine, is stopped when the engine is stopped. As a result, no hydraulic pressure is supplied to the speed change mechanism, whereby the speed change mechanism cannot be operated properly. Thus, a mechanism has been known in which an electric pump is provided as an auxiliary pump in addition to the mechanical pump so that a hydraulic pressure generated by the electric pump is supplied to the speed change mechanism when the engine is stopped.

It is usually difficult to dispose such an electric pump inside a vehicle drive device. Thus, the electric pump is often mounted in contact with the exterior of a case of the vehicle drive device. In the case where the electric pump is mounted on the exterior of the case, a structure in which the electric pump is mounted on a side surface of a torque converter housing of the vehicle drive device (see, for example, Japanese Patent Application Publication No. JP-A-2002-054724 (FIGS. 2 and 3)) has already known in the art. Moreover, a structure in which the electric pump is mounted on a lower surface of the torque converter housing of the vehicle drive device (see, for example, United States Patent Application Publication No. 2005/0205382 (FIGS. 1 and 3)) has also been known in the art.

SUMMARY

As described in Japanese Patent Application Publication No. JPA-2002-054724, however, in the case where the electric pump is mounted on a side surface of the case of the vehicle drive device including the torque converter housing, there has been a problem that the electric pump that protrudes laterally from the case may interfere with other parts such as a vehicle frame and an exhaust pipe, and thus, has poor mountability to vehicles. In the structure described in United States Patent Application Publication No. 2005/0205382, on the other hand, the electric pump is mounted on the lower surface of the torque converter housing, whereby the electric pump is prevented from protruding laterally of the case. However, an intake oil passage and a discharge oil passage, which are connected to the electric pump, need to be provided in the torque converter housing, thereby causing an increase in size of the torque converter housing. Thus, the electric pump, which is mounted on the lower surface of the torque converter housing, protrudes downward, and there has been a problem that it is difficult to ensure the minimum ground clearance of vehicles.

The present invention has been developed in view of the above problems, and it is an object of the present invention to provide a vehicle drive device which is structured so that an electric pump that generates a hydraulic pressure to be supplied to a speed change mechanism is mounted under a case of the drive device, and which has excellent mountability to vehicles and is capable of easily assuring the minimum ground clearance.

A vehicle drive device according to a first aspect of the present invention includes a hydraulically operated speed change mechanism, and is connected to an engine for use. In order to achieve the above object, a characteristic structure of the vehicle drive device of the present invention lies in that: the vehicle drive device includes: a case including a case main body portion accommodating the speed change mechanism, and a connection case portion connecting the engine and the case main body portion, and having a diameter increased toward the engine; a hydraulic pressure control device that is provided under the speed change mechanism, and controls a hydraulic pressure to be supplied to the speed change mechanism; and an electric pump that generates the hydraulic pressure to be supplied to the speed change mechanism through the hydraulic pressure control device. In the vehicle drive device of the present invention, the case includes a peripheral wall portion that protrudes downward from the case main body portion so as to surround a periphery of the hydraulic pressure control device, and a wall on the engine side of the peripheral wall portion serves as a pump mounting wall on which the electric pump is mounted, and a case-side intake oil passage that is connected to a pump-side intake oil passage of the electric pump, and a case-side discharge oil passage that is connected to a pump-side discharge oil passage of the electric pump are provided in the pump mounting wall.

Note that the terms "above" and "under" in this application indicate "above" and "under" in the state where the vehicle drive device is mounted on a vehicle.

According to this characteristic structure, the electric pump is mounted on the pump mounting wall which is the engine-side wall of the peripheral wall portion surrounding the periphery of the hydraulic pressure control device. This enables the electric pump to be mounted so as not to protrude significantly downward by using the space produced under a relatively small-diameter portion between the peripheral wall portion protruding downward from the case main body portion and a large-diameter portion of the connection case portion having a diameter increased from the case main body portion side toward the engine. Thus, this structure has excellent mountability to vehicles, and is capable of easily ensuring the minimum ground clearance. Moreover, since the electric pump is mounted by using the engine-side wall of the peripheral wall portion, the electric pump can be easily mounted in the space under the connection case portion, which tends to have a complex shape, without adding any special support member. Moreover, since the case-side intake oil passage and the case-side discharge oil passage are provided in the pump mounting wall, the structure in which the pump-side oil passages and the case-side oil passages are connected to each other can be easily implemented by merely mounting the electric pump on the pump mounting wall. Moreover, the pump mounting wall is a part of the peripheral wall portion provided under the case main body portion, and the hydraulic pressure control device is provided inside the space surrounded by the peripheral wall portion. Thus, the case-side oil passages that connect the electric pump and the hydraulic pressure control device can be formed with a short length. This enables the structure of the oil passages that connect the electric pump and the hydraulic pressure control device to be simplified as compared to the structure of related art.

A mechanical pump that is driven by a driving force of the engine may be provided in the case, a main intake oil passage and a main discharge oil passage, which connect the Mechanical pump and the hydraulic pressure control device, may be provided in the case main body portion, the case-side intake oil passage may be connected to the main intake oil passage, and the case-side discharge oil passage may be connected to the main discharge oil passage.

According to this structure, in the case where the mechanical pump that is driven by the driving force of the engine is provided in the case in addition to the electric pump, the case-side oil passages that connect the electric pump and the hydraulic pressure control device can be formed by using the oil passages that connect the mechanical pump and the hydraulic pressure control device. This enables the structure of the oil passages that connect the electric pump and the hydraulic pressure control device to be simplified. Moreover, according to this structure, no oil passage need be formed in the connection case portion. Thus, the outer shape of the connection case portion can be reduced in size, thereby facilitating reduction in overall size of the vehicle drive device. Thus, the vehicle drive device having excellent mountability to vehicles and capable of easily assuring the minimum ground clearance can be implemented.

The electric pump may be positioned so as to overlap the case when viewed from above the case.

According to this structure, the electric pump does not protrude significantly laterally from the case of the vehicle drive device. Thus, an interference of the electric pump with other parts, such as a vehicle frame and an exhaust pipe, can be suppressed, whereby mountability to vehicles can be improved. Moreover, even when the exhaust pipe is provided laterally of the vehicle drive device, a relatively large distance can be ensured between the electric pump and the exhaust pipe, and the temperature around the electric pump can be suppressed to a low value. Thus, durability of a motor for driving the electric pump and electronic parts for controlling the electric pump can be easily ensured.

Ribs, which are provided on both outer sides of the electric pump in a width direction of the case and extend in a direction crossing the pump mounting wall, may be formed so as to protrude downward from the connection case portion.

According to this structure, the periphery of the electrode pump can be surrounded by the ribs, the pump mounting wall, and the large-diameter portion of the connection case portion. Thus, the electric pump can be appropriately protected even if the electric pump is provided under the vehicle drive device, that is, the location that tends to be affected by an external environment.

The electric pump may be structured so as to be fixedly fastened to the pump mounting wall by one or more fastening members, one or more fastening holes in which the fastening members are fastened may be provided in the pump mounting wall, at least one of the fastening holes may be a processed fastening hole formed by performing a drilling process in the pump mounting wall, one or both of the case-side intake oil passage and the case-side discharge oil passage may be a processed oil passage formed by performing the drilling process in the pump mounting wall, and the processed fastening hole and the processed oil passage may be positioned so as not to overlap each other in a direction perpendicular to a direction in which the pump mounting wall protrudes from the case main body portion in a wall plane of the pump mounting wall.

In order to provide the fastening holes and the oil passages in the pump mounting wall, the pump mounting wall needs to have a certain wall thickness or more in corresponding portions. Thus, the pump mounting wall has a larger thickness in the portions where the fastening holes, the case-side intake oil passage, and the case-side discharge oil passage are provided, than in the remaining portion. Moreover, in the case where the peripheral wall portion, which protrudes downward from the case main body portion, is formed by casting, a mold is pulled out downward along the protruding direction of the peripheral wall portion. Thus, a single thick portion is formed above the thick portions for providing the fastening holes, the case-side intake oil passage, and the case-side discharge oil passage. In general, in cast products, blow holes tend to be formed in thick portions. Thus, providing the fastening holes and the oil passages in the single thick portion by the drilling process may cause the fastening holes and the oil passages to communicate with each other through blow holes. If the fastening holes and the oil passages communicate with each other through the blow holes, oil flowing in the oil passages flow to the outside from the fastening holes through the blow holes, and such a case is regarded as a defective product. According to the above structure, however, the processed fastening hole and the processed oil passage, which are formed by the drilling process, are positioned so as not to overlap each other in the direction perpendicular to the direction in which the pump mounting wall protrudes from the case main body portion in the wall plane of the pump mounting wall. This can prevent the processed fastening hole and the processed oil passage from being both formed in the single thick portion that extends in the protruding direction of the pump mounting wall. Thus, a communication between the processed fastening hole and the processed oil passage through the blow holes can be suppressed, thereby reducing the possibility that defective products are produced.

Thin portion having a smaller thickness than a thickness of a remaining portion of the pump mounting wall may be formed between the processed fastening hole and the processed oil passage in the direction perpendicular to the direction in which the pump mounting wall protrudes from the case main body portion.

In general, in cast products, blow holes are less likely to be formed in thin portions. According to the above structure, the thin portion, which is a portion where the blow holes are less likely to be formed, is provided between the processed fastening hole and the processed oil passage. This can suppresses generation of the blow holes between the processed fastening hole and the processed oil passage. Thus, the communication between the processed fastening hole and the processed oil passage through the blow holes can be suppressed, thereby further reducing the possibility that defective products are produced.

The structure according to the first aspect of the present invention is suitable especially for a structure that includes the connection case portion having a diameter increased from the case main body portion side toward the engine, in order to accommodate at least one of a torque converter, a damper, and a rotating electrical machine, which often have a larger dimension in the radial direction than that of the speed change mechanism. Note that, in this application, the term "rotating electrical machine" is used as a concept including a motor (an electric motor), a generator (an electric generator), and a motor-generator that functions both as a motor and a generator as required.

The case main body portion and the connection case portion may be formed so as to be separable from each other.

According to this structure, the electric pump can be mounted on the pump mounting wall protruding downward from the case main body portion before the connection case portion is mounted to the case main body portion. This facilitates the mounting work of the electric pump on the pump mounting wall.

DETAILED DESCRIPTION OF EMBODIMENTS

Figure 1:
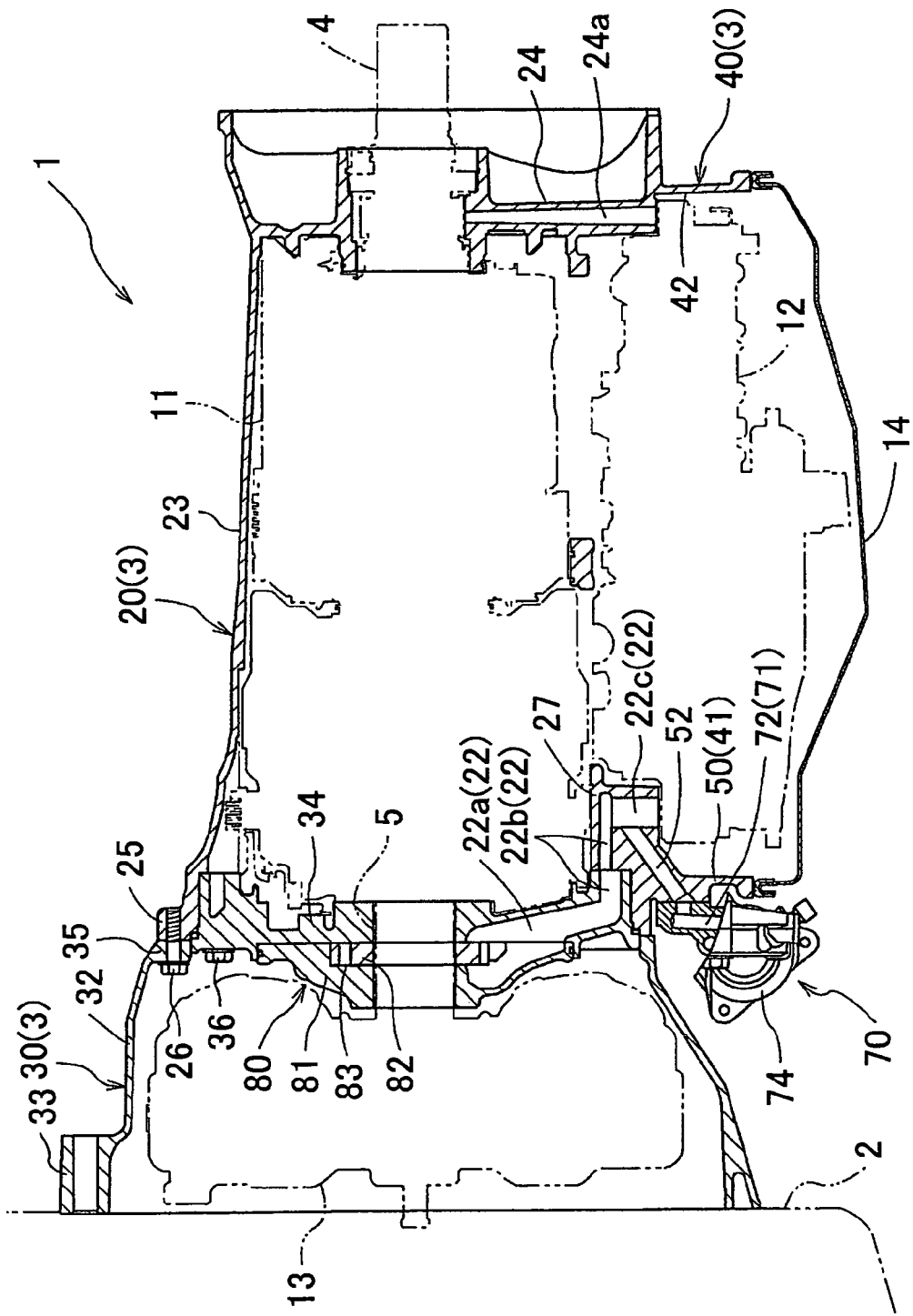
FIG. 1 is an overall cross-sectional view showing a vehicle drive device according to an embodiment of the present invention.
Figure 2:
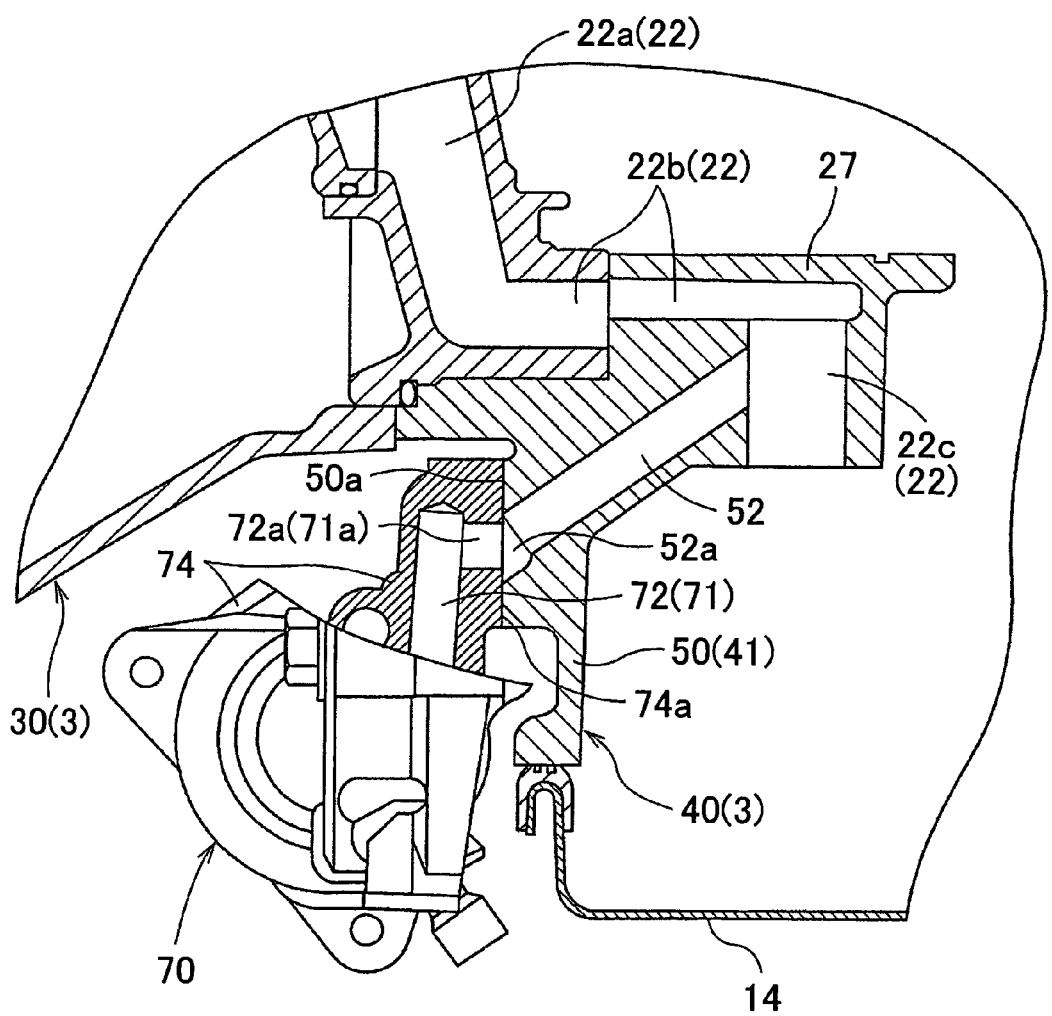
FIG. 2 is an enlarged view of a main part of FIG. 1.
Figure 3:
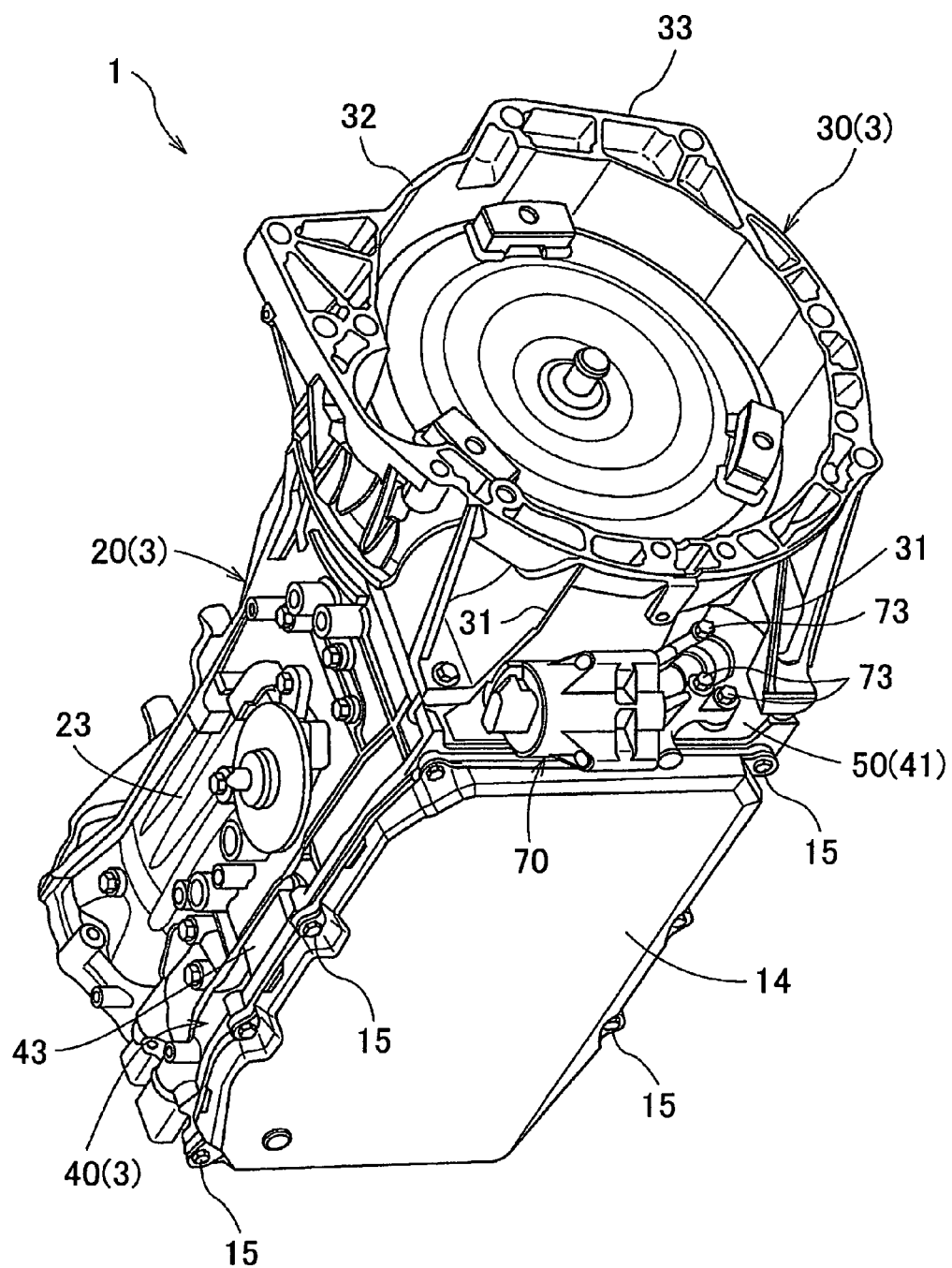
FIG. 3 is a perspective view showing the vehicle drive device of the embodiment of the present invention when viewed obliquely from beneath.
Figure 4:
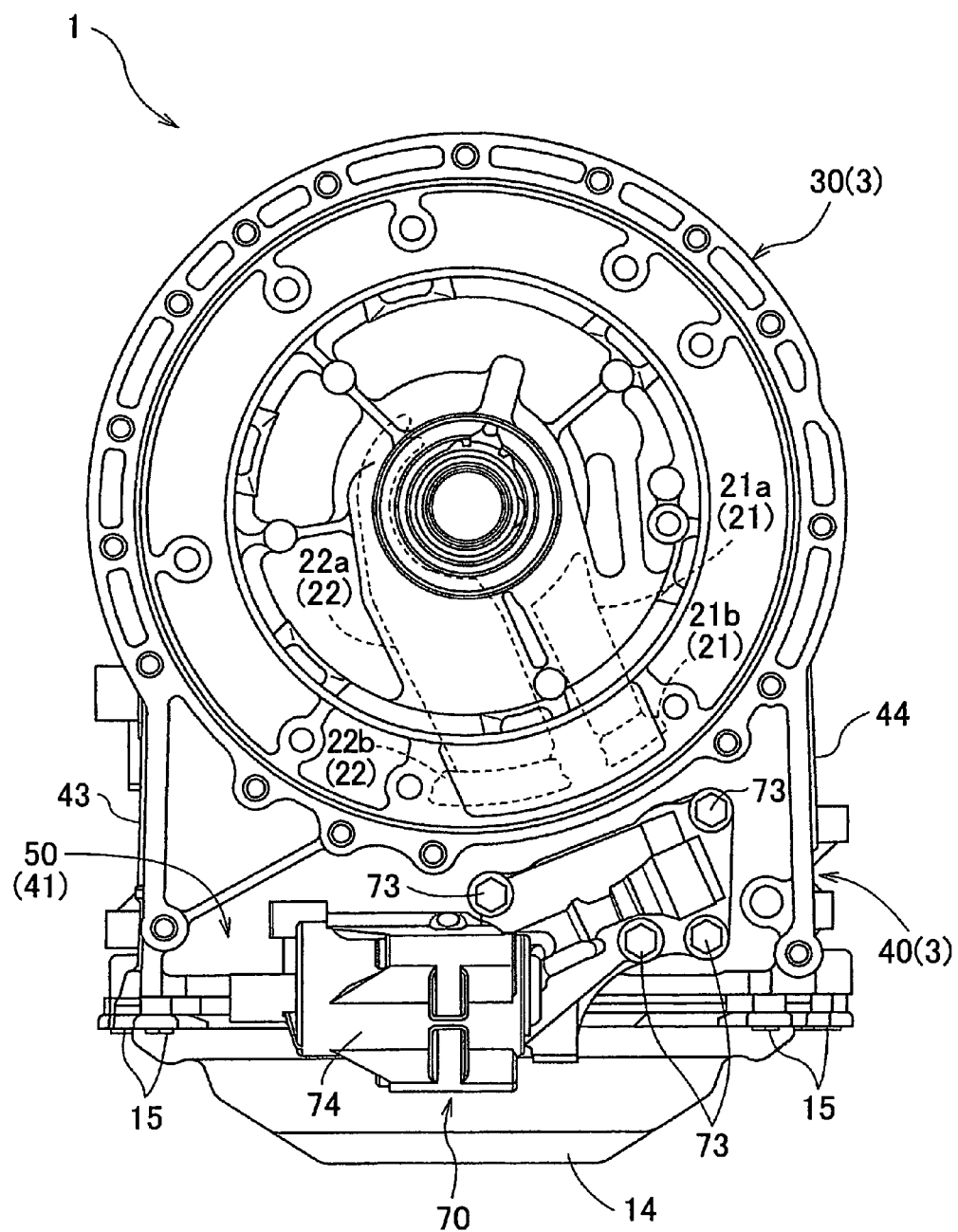
FIG. 4 is a front view of the vehicle drive device of the embodiment of the present invention when viewed from the front.
Figure 5:
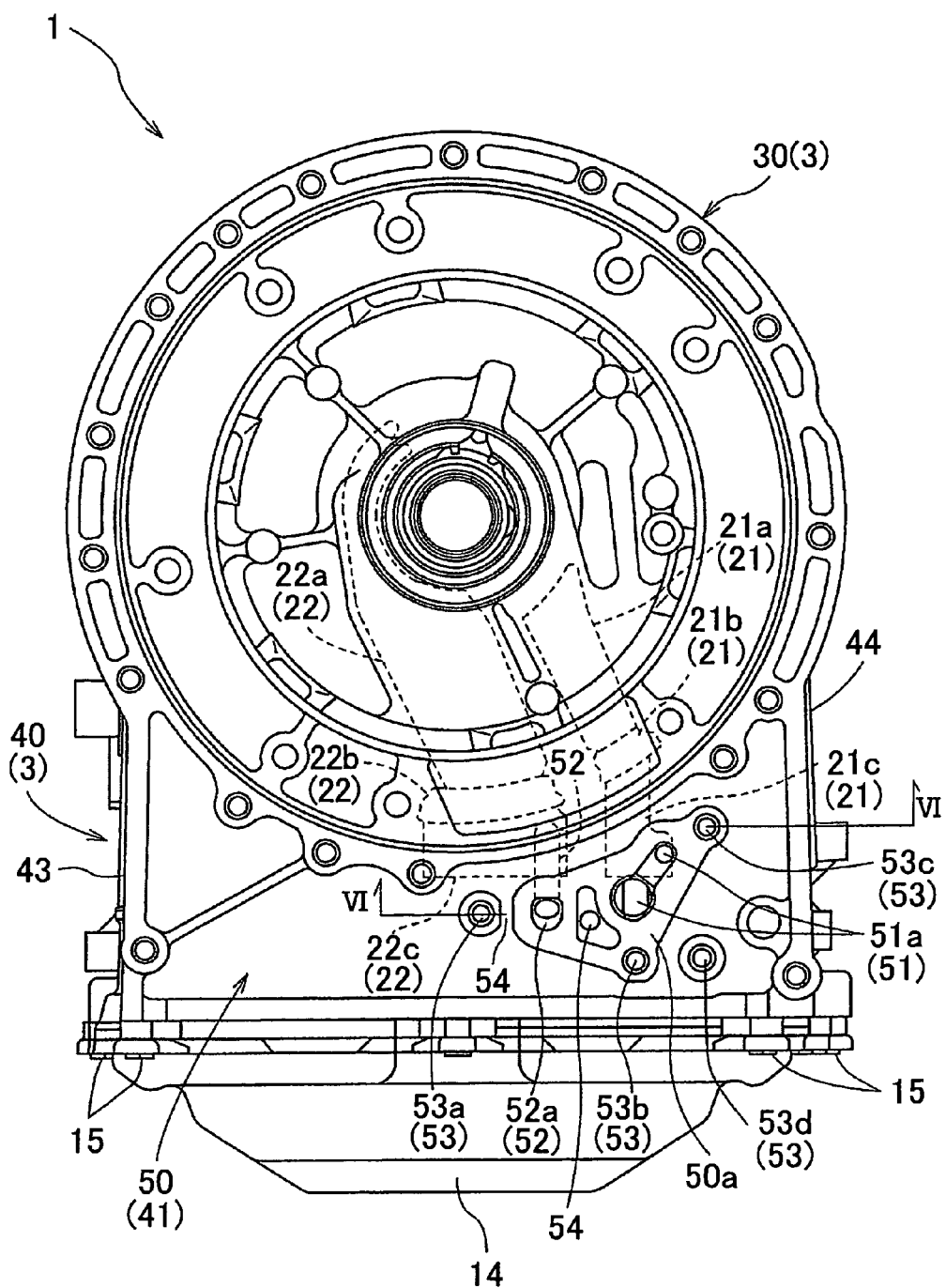
FIG. 5 is a front view showing the state where an electric pump has been removed from the vehicle drive device of the embodiment of the present invention.
Figure 6:
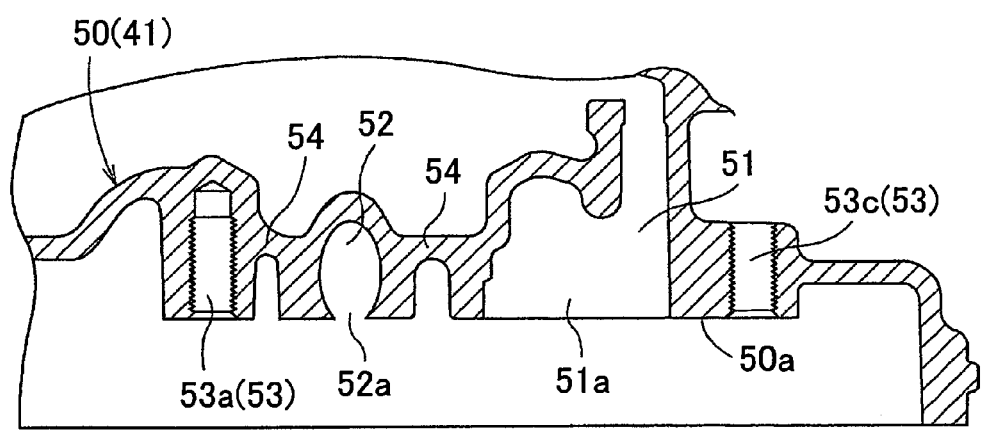
FIG. 6 is a cross-sectional view taken along line VI-VI in FIG. 5.

An embodiment of the present invention will be described below with reference to the accompanying drawings. FIG. 1 is an overall cross-sectional view of a vehicle drive device 1. FIG. 2 is an enlarged view of a main part of FIG. 1. Regarding a speed change mechanism 11, a hydraulic pressure control device 12, a torque converter 13, and an output shaft 4, only the outer shapes are shown by two-dotted chain lines in FIGS. 1 and 2. FIG. 3 is a perspective view of the vehicle drive device 1 when viewed obliquely from beneath. FIG. 4 is a front view of the vehicle drive device 1 when viewed from the front, and FIG. 5 is a front view showing the state where an electric pump 70 has been removed. FIG. 6 is a cross-sectional view taken along line VI-VI in FIG. 5. The present embodiment will be described with respect to an example in which, as shown in FIG. 1, the vehicle drive device 1 is structured as a common automatic transmission which is connected to an engine 2 for use and accommodates the speed change mechanism 11, the hydraulic pressure control device 12, and the torque converter 13 in a case 3. Note that in the description of the present embodiment, the side connected to the engine 2 (the left side in FIG. 1) is defined as "front," and the output shaft 4 side (the right side in FIG. 1) which is opposite to the side connected to the engine 2 is defined as "rear." Moreover, the side of the case 3 on which an oil pan 14 is provided (the lower side in FIG. 1), that is, the lower side in the state where the vehicle drive device 1 is mounted on a vehicle, is defined as "lower," and the side opposite thereto (the upper side in FIG. 1) is defined as "upper." Moreover, the right side when viewed toward the front is defined as "right," and the left side when viewed toward the front is defined as "left."

1. Overall Structure

As shown in FIG. 1, in the vehicle drive device 1, a front end of the case 3 is fixedly connected to the engine 2. This vehicle drive device 1 includes the hydraulically operated speed change mechanism 11 accommodated in the case 3. Although detailed description of the structure of the speed change mechanism 11 is omitted, various known types of stepped speed change mechanisms and continuously variable speed change mechanisms may be accommodated in the case 3. Note that examples of the stepped speed change mechanisms include a speed change mechanism including a planetary gear unit, and an engaging element, such as a clutch and a brake, engaging rotary elements of the planetary gear unit, and a speed change mechanism including a constant mesh type gear set and a synchronizing mechanism. Examples of the continuously variable speed change mechanisms include a belt type continuously variable speed change mechanism and a toroidal type continuously variable speed change mechanism, and in addition, an electric continuously variable speed change mechanism formed by combination of a rotating electrical machine and a differential gear unit. In any case, the present invention is intended for a speed change mechanism which includes a mechanism that is operated by a hydraulic pressure of a hydraulic cylinder or the like for operating parts, such as engaging elements like a brake and a clutch, a synchronizing mechanism, and a movable sheave of a pulley. Moreover, in the present embodiment, the torque converter 13 is provided forward of the speed change mechanism 11, and the hydraulic pressure control device 12 is provided under the speed change mechanism 11. The hydraulic pressure control device 12 is a device for controlling a hydraulic pressure to be supplied to the speed change mechanism 11, and includes one or more hydraulic pressure control valves. The torque converter 13 and the hydraulic pressure control device 12 are also accommodated in the case 3. Although not shown in the drawing, a pump impeller, serving as an input member of the torque converter 13, is connected so as to rotate integrally with an output shaft such as a crankshaft of the engine 2.

The case 3 includes a case main body portion 20, a connection case portion 30, and a skirt portion 40. The case main body portion 20 accommodates mainly the speed change mechanism 11. The case main body portion 20 herein has a substantially cylindrical peripheral wall 23 whose inner diameter and outer diameter increase slightly toward the front, and a rear end wall 24 that covers the rear of the speed change mechanism 11. The output shaft 4 extends through a radial central portion of the rear end wall 24, and is rotatably supported by the rear end wall 24. An oil passage 24a, through which lubricating oil discharged from the hydraulic pressure control device 12 flows, is provided in the rear end wall 24. Moreover, the lower part of the peripheral wall 23 is open so as to connect the space in which the speed change mechanism 11 is accommodated and the space in which the hydraulic pressure control device 12 is accommodated, and merely a lower wall body 27 is left in a part of the lower part of the peripheral wall 23. In this example, the lower wall body 27 is provided in the lower part near the front end of the case main body portion 20. Moreover, as described below, a main intake oil passage 21 and a main discharge oil passage 22, which are oil passages on the case 3 side, are formed in the lower wall body 27. Moreover, a connection flange 25 for connecting the case main body 20 with the connection case portion 30 is provided in the front end of the peripheral wall 23. A fastening hole for fastening a bolt 26 as a fastening member therein is provided in this connection flange 25.

The connection case portion 30 is provided on the front side (on the engine 2 side) of the case main body portion 20. The connection case portion 30 connects the engine 2 and the case main body portion 20, and is formed so that its diameter increases toward the engine 2. The connection case portion 30 herein accommodates mainly the torque converter 13. Thus, the connection case portion 30 includes a peripheral wall 32 formed so that its inner and outer diameters increase toward the front. In this example, the peripheral wall 32 of the connection case portion 30 is formed in a substantially dome shape. An engine-side flange 33 for connecting the case main body portion 20 to the engine 2 is provided in the front end of the connection case portion 30. An insertion hole through which a bolt as a fastening member (not shown) is inserted is provided in the engine-side flange 33. The connection case portion 30 is fixedly fastened to the engine 2 by the bolt inserted thorough the insertion hole. Moreover, a main body-side flange 35 is provided in the rear end of the connection case portion 30, and an insertion hole through which the bolt 26 is inserted is provided in the main-body-side flange 35. The case main body portion 20 and the connection case portion 30 are fixedly fastened and connected to each other by fastening the bolt 26, which is inserted through the insertion hole, in the fastening hole of the connection flange 25. Moreover, a plurality of ribs 31 (see FIG. 3) are formed so as to stand on the lower surface of the connection case portion 30. The structure of the ribs 31 will be described later.

Moreover, a partition wall 34 for separating the space inside the connection case portion 30 and the space inside the case main body portion 20 is provided in the rear end of the connection case portion 30, that is, in the boundary between the connection case portion 30 and the case main body portion 20. The partition wall 34 is herein mounted radially inside the connection case portion 30 so as to cover a front end opening of the case main body portion 20 from the front side of the front end of the case main body portion 20. In this example, the partition wall 34 is fastened to the case main body portion 20 by a bolt 36 as a fastening member, which is inserted through an insertion hole provided in the partition wall 34 and fastened in a fastening hole provided in the case main body portion 20. Thus, the partition wall 34 is a wall that covers the front of the speed change mechanism 11. An intermediate shaft 5 extends through a radial central portion of the partition wall 34, and is rotatably supported by the partition wall 34. This intermediate shaft 5 serves both as an output shaft of the torque converter 13 and an input shaft of the speed change mechanism 11.

A mechanical pump 80 is mounted on the partition wall 34. Thus, the mechanical pump 80 is provided in a boundary region between the case main body portion 20 and the connection case portion 30 in the case 3 (in a front end region of the case main body portion 20). Moreover, since the partition wall 34 is mounted on the case main body portion 20 as described above, the mechanical pump 80 is mounted on the case main body portion 20 through the partition wall 34. The mechanical pump 80 is herein structured to have a pump case 81 and a rotor 82. The pump case 81 forms a pump chamber 83 inside in cooperation with the partition wall 34 so that the rotor 82 is accommodated in the pump chamber 83. In this example, a recess for forming the pump chamber 83 is formed in the surface on the partition wall 34 side of the pump case 81. The rotor 82 is rotatably accommodated in the pump chamber 83 formed in the pump case 81, and is drivingly connected to the intermediate shaft 5. Thus, the mechanical pump 80 is driven by the driving force of the engine 2 through the torque converter 13. In this example, the mechanical pump 80 is an internal gear pump, and both an inner rotor and an outer rotor that form the rotor 82 are accommodated in the pump chamber 83, and the inner rotor is fixed to the intermediate shaft 5. Note that the structure of the mechanical pump 80 is not limited to this, and an external gear pump, a vane pump, or the like is also preferable in terms of the pump type. The mechanical pump 80 is communicatively connected with the hydraulic pressure control device 12 through the main intake oil passage 21 and the main discharge oil passage 22 which are provided in the case main body portion 20. Note that the structure of these oil passages will be described in detail below. The mechanical pump 80 pumps up oil accumulated in the oil pan 14 through the hydraulic pressure control device 12, and generates a hydraulic pressure. The oil discharged from the mechanical pump 80 is supplied to each part of the vehicle drive device 1, such as the speed change mechanism 11, through the hydraulic pressure control device 12. That is, the mechanical pump 80 generates a hydraulic pressure to be supplied to each part of the vehicle drive device 1, such as the speed change mechanism 11, through the hydraulic pressure control device 12.

The skirt portion 40 is a wall-like portion that protrudes downward from the case main body portion 20 so as to surround the periphery of the hydraulic pressure control device 12 provided under the speed change mechanism 11, and corresponds to a peripheral wall portion according to the present invention. That is, the skirt portion 40 accommodates mainly the hydraulic pressure control device 12. In the present embodiment, as shown in FIGS. 1, 3, and 4, the skirt portion 40 is provided integrally on the lower part of the case main body portion 20, and is formed in a rectangular frame shape that is substantially rectangular when viewed from underneath. More specifically, the skirt portion 40 is structured to have a front wall portion 41 that covers the front (the engine 2 side) of the hydraulic pressure control device 12, a rear wall portion 42 that covers the rear of the hydraulic pressure control device 12, and a right sidewall portion 43 and a left sidewall portion 44 that respectively cover the right and left sides of the hydraulic pressure control device 12. The front wall portion 41 is herein provided under near the front end of the case main body portion 20. As described below, the front wall portion 41 serves as a pump mounting wall 50 on which the electric pump 70 is mounted. The rear wall portion 42 is provided under near the rear end wall 24 of the case main body portion 20. The front wall portion 41 and the rear wall portion 42 are provided in parallel with each other. The right sidewall portion 32 and the left sidewall portion 44 are provided in parallel with each other at an interval that is substantially the same as the lateral width of the case main body portion 20. In this example, the front wall portion 41, the rear wall portion 42, the right sidewall portion 43, and the left sidewall portion 44 of the skirt portion 40 are substantially flat-plate-like wall bodies that are provided along a vertical plane. Moreover, in this example, the lower surface of the skirt portion 40 is a substantially horizontal plane. Thus, the skirt portion 40 forms an internal space in a substantially rectangular parallelepiped shape on the lower part of the case main body portion 20 so as to accommodate the hydraulic pressure control device 12.

The oil pan 14 is mounted on the lower surface of the skirt portion 40. The oil pan 14 is provided so as to entirely cover an opening that opens at the bottom of the skirt portion 40. Thus, the internal space of the skirt portion 40 is hermetically sealed from the outside. As shown in FIGS. 3 and 4, the oil pan 14 is fixedly fastened to the lower surface of the skirt portion 40 by bolts 15 as fastening members. The lower surface of the skirt portion 40 and the oil pan 14 are hermetically sealed by a sealant. The oil pan 14 is formed by processing a plate-like member. Then, the hydraulic pressure control device 12 is accommodated in the internal space surrounded by the skirt portion 40 and the oil pan 14.

As described above, the case main body portion 20 and the skirt portion 40 are formed integrally. On the other hand, the connection case portion 30 is formed as a separate member from the case main body portion 20, and the connection case portion 30 and the case main body portion 20 are fixedly fastened by the bolt 26. In other words, the case main body portion 20 and the connection case portion 30 are structured so as to be separable from each other. In the present embodiment, the case main body portion 20 and the skirt portion 40 are formed integrally by casting. Moreover, the connection case portion 30 is formed separately from the case main body portion 20 by casting.

2. Structure of the Case-Side Oil Passages

As described above, the mechanical pump 80 is provided in the case 3. Moreover, the main intake oil passage 21 and the main discharge oil passage 22, which connect the mechanical pump 80 and the hydraulic pressure control device 12, are provided in the case main body portion 20. That is, an intake port of the mechanical pump 80 is communicatively connected with the hydraulic pressure control device 12 through the main intake oil passage 21 provided in the case main body portion 20, and a discharge port of the mechanical pump 80 is communicatively connected with the hydraulic pressure control device 12 through the main discharge oil passage 22 provided in the case main body portion 20. In the present embodiment, as shown in FIGS. 1 and 5, the main intake oil passage 21 and the main discharge oil passage 22 are formed from the partition wall 34 and the pump case 81, where the pump chamber 83 of the mechanical pump 80 is formed, to the case main body portion 20.

More specifically, the main discharge oil passage 22 is structured to have a first radial oil passage 22a, an axial oil passage 22b, and a second radial oil passage 22c. The first radial oil passage 22a is an oil passage which is formed in the partition wall 34 and the pump case 81 and extends radially outward from the discharge port of the mechanical pump 80 (a discharge port from the pump chamber 83). In this example, as shown specifically in FIG. 5, the first radial oil passage 22a is formed so as to extend downward slightly obliquely to the left (to the right in FIG. 5). The axial oil passage 22b is an oil passage that extends axially from the partition wall 34 to the lower wall body 27 of the case main body portion 20. The axial oil passage 22b connects a radial outer end of the first radial oil passage 22a and a radial inner end of the second radial oil passage 22c so that the first radial oil passage 22a and the second radial oil passage 22c communicate with each other. The second radial oil passage 22c is an oil passage that extends radially outward from near the rear end of the axial oil passage 22b. A radial outer end of the second radial oil passage 22c is communicatively connected with a high pressure port of the hydraulic pressure control device 12. In this example, as shown specifically in FIG. 5, the second radial oil passage 22c is formed so as to extend downward substantially in the vertical direction.

Although not appearing in FIG. 1, the main intake oil passage 21 is basically structured similarly to the main discharge oil passage 22. That is, as shown in FIG. 5, the main intake oil passage 21 is structured to have a first radial oil passage 21a, an axial oil passage 21b, and a second radial oil passage 21c. The first radial oil passage 21a is an oil passage that is formed in the partition wall 34 and the pump case 81 and extends radially outward from the intake port of the mechanical pump 80 (an intake port from the pump chamber 83). In this example, the first radial oil passage 21a is formed so as to extend downward slightly obliquely to the left (to the right in FIG. 5). Similar to the axial oil passage 22b of the main discharge oil passage 22 shown in FIG. 1, the axial oil passage 21b is an oil passage that extends axially from the partition wall 34 to the lower wall body 27 of the case main body portion 20. The axial oil passage 21b connects a radial outer end of the first radial oil passage 21a and a radial inner end of the second radial oil passage 21c so that the first radial oil passage 21a and the second radial oil passage 21c communicate with each other. The second radial oil passage 21c is an oil passage that extends radially outward from near the rear end of the axial oil passage 21b. A radial outer end of the second radial oil passage 21c is communicatively connected with a low pressure port of the hydraulic pressure control device 12. In this example, the second radial oil passage 21c is formed so as to extend downward substantially in the vertical direction.

3. Structure and Arrangement of the Electric Pump

The vehicle drive device 1 includes, in addition to the mechanical pump 80 described above, the electric pump 70 that generates a hydraulic pressure to be supplied to each part of the vehicle drive device 1, such as the speed change mechanism 11, through the hydraulic pressure control device 12. That is, similar to the mechanical pump 80, the electric pump 70 also pumps up oil accumulated in the oil pan 14 through the hydraulic pressure control device 12, and generates a hydraulic pressure. Moreover, the oil discharged from the electric pump 70 is supplied to each part of the vehicle drive device 1, such as the speed change mechanism 11, through the hydraulic pressure control device 12. Although not shown in the drawing, the electric pump 70 includes a pump main body that generates a hydraulic pressure, and an electric motor serving as a driving force source of the pump main body. This electric motor is provided separately from a driving force source of the vehicle, and operates by using electric power such as a battery which is not shown. Moreover, the pump main body of the electric pump 70 is an internal gear pump in this example, and is structured so that both an inner rotor and an outer rotor of a rotor are accommodated in a pump chamber, and that the inner rotor is drivingly rotated by the electric motor. Note that the structure of the electric pump 70 is not limited to this, and an external gear pump, a vane pump, or the like is also preferable in terms of the pump type. The electric motor and the pump main body of such an electric pump 70 are accommodated in an electric pump case 74. As shown in FIG. 2, the electric pump case 74 has a mounting surface 74a that is in contact with a mounting surface 50a of the pump mounting wall 50 when the electric pump case 74 is mounted on the pump mounting wall 50.

The electric pump 70 has a pump-side intake oil passage 71 and a pump-side discharge oil passage 72. The pump-side intake oil passage 71 is an oil passage that connects the pump main body of the electric pump 70 and a case-side intake oil passage 51 described below. The pump-side discharge oil passage 72 is an oil passage that connects the pump main body of the electric pump 70 and a case-side discharge oil passage 52 described below. As shown in FIGS. 1 and 2, the pump-side intake oil passage 71 and the pump-side discharge oil passage 72 are provided in the electric pump case 74. Note that, although only the pump-side discharge oil passage 72 appears in the cross-sectional views of FIGS. 1 and 2, the pump-side intake oil passage 71 also has a similar structure. The pump-side intake oil passage 71 is an oil passage that communicates with an intake port of the pump chamber of the pump main body, not shown, and is open to the mounting surface 74a of the electric pump case 74. The pump-side discharge oil passage 72 is an oil passage that communicates with a discharge port of the pump chamber of the pump main body, not shown, and is open to the mounting surface 74a of the electric pump case 74. Moreover, an opening 71a of the pump-side intake oil passage 71, which is located in the mounting surface 74a, is positioned so as to correspond to the position of an opening 51a (see FIG. 5) of the case-side intake oil passage 51 which is open to the mounting surface 50a of the pump mounting wall 50. Moreover, an opening 72a of the pump-side discharge oil passage 72, which is located in the mounting surface 74a, is positioned so as to correspond to the position of an opening 52a (see FIGS. 2 and 5) of the case-side discharge oil passage 52 which is open to the mounting surface 50a of the pump mounting wall 50. Thus, in the state where the electric pump 70 is mounted on the pump mounting wall 50, the pump-side intake oil passage 71 is communicatively connected with the case-side intake oil passage 51 provided in the pump mounting wall 50, and the pump-side discharge oil passage 72 is communicatively connected with the case-side discharge oil passage 52 provided in the pump mounting wall 50.

As shown in FIGS. 3 and 4, the electric pump 70 is mounted on the pump mounting wall 50 by a plurality of fastening bolts 73 as fastening members. In this example, the electric pump 70 is mounted on the pump mounting wall 50 by four fastening bolts 73. Thus, a plurality of (four in this example) insertion holes through which the fastening bolts 73 are inserted are provided in the electric pump case 74. Moreover, as shown in FIG. 5, a plurality of (four in this example) fastening holes 53 in which the fastening bolts 73 are fastened are provided in the pump mounting wall 50. These insertion holes and the fastening holes 53 are positioned so as to correspond to each other. Thus, the electric pump 70 is fixedly fastened to the pump mounting wall 50 by fastening the fastening bolts 73, which is inserted through the insertion holes of the electric pump case 74, in the fastening holes 53.

Thus, since the electric pump 70 is mounted on the pump mounting wall 50, the electric pump 70 is positioned in the space that is produced under a relatively small-diameter portion between the skirt portion 40 protruding downward from the case main body portion 20 and a large-diameter portion on the engine 2 side of the connection case portion 30 in the axial direction of the vehicle drive device 1, as shown in FIG. 1. Thus, the electric pump 70 can be provided so as not to protrude significantly under the vehicle drive device 1. In this example, as shown in FIGS. 1 and 4, the lower end of the electric pump 70 is provided so as to be positioned above the lower end of the oil pan 14. Thus, this structure can easily ensure the minimum ground clearance of the vehicle. Moreover, since the wall on the engine 2 side of the skirt portion 40 is used as the pump mounting wall 50 on which the electric pump 70 is mounted, the electric pump 70 can be easily mounted in the space under the connection case portion 30, which tends to have a complex shape, without adding any special support member.

Moreover, the electric pump 70 is provided so as to overlap the case 3 when viewed from above the case 3. The electric pump 70 is herein provided so as to entirely overlap the case main body portion 20 and the connection case portion 30 when viewed from above. In other words, the electric pump 70 is provided so as to overlap the case main body portion 20 and the connection case portion 30 in the width direction (the lateral direction) of the vehicle drive device 1, that is, so as to fit in the range of the lateral width of the case main body portion 20 and the connection case portion 30. With this arrangement, the electric pump 70 does not protrude laterally in the width direction (the lateral direction) from the connection case portion 30. Thus, an interference of the electric pump 70 with other parts, such as a vehicle frame and an exhaust pipe, can be suppressed, whereby excellent mountability to vehicles can be ensured. Moreover, as shown in FIG. 3, the ribs 31 are respectively provided on both outer sides of the electric pump 70 in the width direction of the case 3. These ribs 31 protrude downward from the connection case portion 30 so as to extend in the direction crossing the pump mounting wall 50. In this example, the ribs 31 have a thin plate shape, and are provided integrally so as to stand on the lower surface of the connection case portion 30. By providing such ribs 31, the left and right sides of the electric pump 70 are at least partially covered by the ribs 31. Moreover, in the longitudinal direction, the front of the electric pump 70 is covered by the large-diameter portion of the connection case portion 30, and the rear of the electric pump 70 is covered by the pump mounting wall 50. Thus, the periphery of the electric pump 70 is surrounded by a wall or a wall-like member. Thus, the electric pump 70 can be appropriately protected even if the electric pump 70 is provided under the vehicle drive device 1, that is, the location that tends to be affected by an external environment.

4. Structure of the Pump Mounting Wall

As described above, the front (the engine 2-side) wall of the skirt portion 40 is used as the pump mounting wall 50 on which the electric pump 70 is mounted. Moreover, the front surface (the engine 2-side surface) of the pump mounting wall 50 serves as the mounting surface 50a, and as described above, the electric pump 70 is mounted on the mounting surface 50a. The case-side intake oil passage 51 and the case-side discharge oil passage 52 for connecting the electric pump 70 and the hydraulic pressure control device 12 are provided in the pump mounting wall 50. The case-side intake oil passage 51 is connected to the pump-side intake oil passage 71 in the state where the electric pump 70 is mounted on the pump mounting wall 50. The case-side discharge oil passage 52 is connected to the pump-side discharge oil passage 72 in the state where the electric pump 70 is mounted on the pump mounting wall 50. Thus, as shown in FIGS. 5 and 6, the case-side intake oil passage 51 has the opening 51a that is open to the mounting surface 50a of the pump mounting wall 50. This opening 51a is connected to the opening 71a of the pump-side intake oil passage 71. In this example, the opening 51a of the case-side intake oil passage 51 is extended obliquely downward, and the lower end of the opening 51a is formed as a large-diameter portion having an increased diameter. Moreover, as shown in FIGS. 2, 5, and 6, the case-side discharge oil passage 52 has the opening 52a that is open to the mounting surface 50a of the pump mounting wall 50. This opening 52a is connected to the opening 72a of the pump-side discharge oil passage 72. In this example, the opening 52a of the case-side discharge oil passage 52 is a large-diameter portion having a slightly increased diameter.

Moreover, the case-side intake oil passage 51 is connected to the main intake oil passage 21, and the case-side discharge oil passage 52 is connected to the main discharge oil passage 22. More specifically, as shown in FIGS. 2 and 5, the case-side discharge oil passage 52 is provided so that an end located on the opposite side to the opening 52a is open to communicate with the second radial oil passage 22c of the main discharge oil passage 22. In this case, since the second radial oil passage 22c of the main discharge oil passage 22 is provided above with respect to the position of the opening 52a of the case-side discharge oil passage 52, the case-side discharge oil passage 52 is formed as an oil passage that is tilted obliquely upward from the opening 52a toward the main discharge oil passage 22. In order to implement such a shape, in the present embodiment, the case-side discharge oil passage 52 is formed as a processed oil passage that is formed by performing a drilling process in the pump mounting wall 50. That is, the case-side discharge oil passage 52 is an oil passage that is formed by performing the drilling process in the pump mounting wall 50 with a drill or the like after the pump mounting wall 50, together with the case main body portion 20 and other parts of the skirt portion 40, are formed by casting.

Although not shown in FIG. 2, similar to the case-side discharge oil passage 52, the case-side intake oil passage 51 is provided so that an end located on the opposite side to the opening 51a is open to communicate with the second radial oil passage 21c that forms the main intake oil passage 21. As shown in FIG. 5, however, in the case-side intake oil passage 51, the upper end of the opening 51a is positioned so as to overlap the second radial oil passage 21c of the main intake oil passage 21 in a front view from the engine 2 side. Thus, the case-side intake oil passage 51 is formed as an oil passage that extends in a substantially horizontal direction from the upper end of the opening 51a toward the main intake oil passage 21 along the axial direction of the vehicle drive device 1. Moreover, as described above, the opening 51a of the case-side intake oil passage 51 is extended obliquely downward, and the lower end of the opening 51a is formed as a large-diameter portion having an increased diameter. Thus, in order to implement such a shape, in the present embodiment, the case-side intake oil passage 51 is formed as a cored oil passage that is formed by coring simultaneously with casting of the pump mounting wall 50. That is, the case-side intake oil passage 51 is an oil passage that is formed using a core or the like simultaneously when the pump mounting wall 50, together with the case main body portion 20 and other parts of the skirt portion 40, are formed by casting.

Moreover, as shown in FIG. 5, the plurality of (four in this example) fastening holes 53 in which the fastening bolts 73 are fastened for mounting the electric pump 70 are provided in the pump mounting wall 50. In the present embodiment, all the fastening holes 53 are processed fastening holes that are formed by performing the drilling process in the pump mounting wall 50. On the other hand, in the present embodiment, the pump mounting wall 50, together with the case main body portion 20 and other parts of the skirt portion 40, are formed by casting. Blow holes are necessarily formed inside such a cast product. Moreover, when the oil passages and the fastening holes are formed in the pump mounting wall 50 by the drilling process, the blow holes generated inside the cast product can appear on the processed hole surfaces, and in some cases, the oil passages and the fastening holes can communicate with each other through the blow holes. In the present embodiment, the case-side discharge oil passage 52 and the fastening holes 53 are formed in the pump mounting wall 50 by the drilling process. Thus, if the case-side discharge oil passage 52 and the fastening holes 53 communicate with each other through the blow holes, oil flowing in the case-side discharge oil passage 52 flows through the blow holes and to the outside from the fastening holes 53, and such a case 3 is regarded as a defective product. Thus, in the vehicle drive device 1 of the present embodiment, a measure has been taken to prevent the case-side discharge oil passage 52 and the fastening holes 53 from communicating with each other through the blow holes. This will be described below.

In order to provide the fastening holes 53 and the oil passages (in this example, the case-side intake oil passage 51 and the case-side discharge oil passage 52) in the pump mounting wall 50, the pump mounting wall 50 needs to have a certain wall thickness or more in corresponding portions to secure regions where the fastening holes 53 and the oil passages, which extend in the thickness direction of the pump mounting wall 50, are provided. Thus, in the present embodiment, as shown in FIG. 6, the pump mounting wall 50 has a larger thickness in the portions where the fastening holes 53, the case-side intake oil passage 51, and the case-side discharge oil passage 52 are provided, than in the remaining portion. The skirt portion 40, which protrudes downward from the case main body portion 20, is formed by casting as described above. A mold for forming the skirt portion 40 is pulled out downward along the direction in which the skirt portion 40 protrudes from the case main body portion 20 (the downward direction). Thus, a single thick portion is formed above the thick portions for providing the fastening holes 53, the case-side intake oil passage 51, and the case-side discharge oil passage 52. In general, in cast products, blow holes tend to be formed in thick portions. Thus, providing the case-side discharge oil passage 52 and the fastening holes 53 in the single thick portion by the drilling process can cause the case-side discharge oil passage 52 and the fastening holes 53 to communicate with each other through blow holes.

Thus, in the present embodiment, the case-side discharge oil passage 52 and the fastening holes 53, which are provided by the drilling process, are positioned so as not to overlap each other in a direction perpendicular to the direction in which the pump mounting wall 50 protrudes from the case main body portion 20 in the wall plane of the pump mounting wall 50 (the vertical direction in this example) (i.e., so as not to overlap each other in the width direction (the lateral direction) of the vehicle drive device 1 in this example; this direction is hereinafter simply referred to as the "width direction"). That is, the case-side discharge oil passage 52 is provided at a different position from those of the plurality of fastening holes 53 in the width direction. More specifically, the fastening hole that is located at the leftmost position in FIG. 5 among the four fastening holes 53 is herein referred to as a first fastening hole 53a, the fastening hole that is located in the middle is referred to as a second fastening hole 53b, the fastening hole that is located at the upper right position is referred to as a third fastening hole 53c, and the fastening hole that is located at the lower right position is referred to as a fourth fastening hole 53d. In this case, the case-side discharge oil passage 52 is positioned between the first fastening hole 53a and the second fastening hole 53b in the width direction. This can prevent the case-side discharge oil passage 52 and the fastening holes 53, which are formed by the drilling process, from being both formed in the single thick portion that extends in the protruding direction of the skirt portion 40 (the downward direction). Thus, a communication between the case-side discharge oil passage 52 and the fastening holes 5 through the blow holes can be suppressed, thereby reducing the possibility that defective products are produced.

Moreover, in the present embodiment, the pump mounting wall 50 has thin portions 54, having a smaller thickness than that of the remaining portion, between the case-side discharge oil passage 52 and the fastening holes 53 in the width direction. More specifically, as shown in FIGS. 5 and 6, the thin portions 54 are formed between the first fastening hole 53a and the case-side discharge oil passage 52, and between the case-side discharge oil passage 52 and the second fastening hole 53b. As specifically shown in FIG. 6, in this example, the thin portions 54 are provided by forming recesses on the mounting surface 50a side (the engine 2 side) of the pump mounting wall 50. In general, in cast products, the blow holes are less likely to be formed in thin portions. Thus, forming the thin portions 54 between the case-side discharge oil passage 52 and the fastening holes 53 can suppress generation of the blow holes between the case-side discharge oil passage 52 and the fastening holes 53. Accordingly, the communication between the case-side discharge oil passage 52 and the fastening holes 53 through the blow holes can be suppressed, thereby further reducing the possibility that defective products are produced. That is, such thin portions 54 function as trimming thin portions for trimming so that the oil passage and the fastening holes do not communicate with each other through the blow holes.

Note that, since the case-side intake oil passage 51 is formed by coring as described above, no blow hole appears on the surface of the oil passage. Thus, there is no possibility that the case-side intake oil passage 51 and the fastening holes 53 communicate with each other though the blow holes, even if the case-side intake oil passage 51 and the fastening holes 53 are positioned so as to overlap each other in the width direction, and are formed in the single thick portion. For the same reason, no thin portion 54 need be provided between the case-side intake oil passage 51 and the fastening holes 53. Thus, in the present embodiment, the case-side intake oil passage 51 and the second fastening hole 53b are positioned so as to overlap each other in the width direction, and no thin portion 54 is provided between the case-side intake oil passage 51 and the second fastening hole 53b and between the case-side intake oil passage 51 and the third fastening hole 53c.

5. Other Embodiments (1) The above embodiment has been described with respect to an example in which the torque converter 13 integrally including a damper is accommodated in the connection case portion 30. However, embodiments of the present invention are not limited to this. Thus, it is also one of preferred embodiments of the present invention that only a damper or only a rotating electrical machine be accommodated in the connection case portion 30, or that two or more elements selected from the torque converter, the damper, and the rotating electrical machine be accommodated in the connection case portion 30. The rotating electrical machine herein serves, together with the engine 2, as a driving force source of the vehicle, and a motor-generator that functions as an electric motor or an electric generator as required is preferably used as the rotating electrical machine. A drive device including such a rotating electrical machine are a drive device for a hybrid vehicle. The examples of the drive device for a hybrid vehicle include a drive device having one rotating electrical machine, and a drive device having two or more rotating electrical machines. In addition to being accommodated in the connection case portion 3, it is also preferable that the rotating electrical machine(s) be accommodated in the case main body portion 20, together with the speed change mechanism 11. In the drive device for a hybrid vehicle including the rotating electrical machine(s), the mechanical pump 80 is driven by the driving force of one or both of the engine 2 and the rotating electrical machine(s) which serve as a driving force source of the vehicle.

(2) The above embodiment has been described with respect to an example in which the lower surface of the skirt portion 40 serving as a peripheral wall portion is a substantially horizontal plane. However, embodiments of the present invention are not limited to this. That is, the peripheral wall portion (the skirt portion 40) formed so as to surround the hydraulic pressure control device 12 need only be formed so that at least the engine 2-side wall of the peripheral wall portion has a height large enough for mounting the electric pump thereon. The shape and the height of the walls of other parts of the peripheral wall portion, that is, both lateral walls and the rear wall (the wall located on the side opposite to the engine 2), are not specifically limited. Thus, for example, it is also one of preferred embodiments of the present invention that the peripheral wall portion be formed so that the lower surface thereof is tilted with respect to a horizontal plane. In this case, for example, it is also preferable that the lower surface of the peripheral wall portion be tilted upward toward the rear (toward the side opposite to the engine 2). In any case, the peripheral wall portion and the oil pan are formed so that the hydraulic pressure control device 12 is accommodated in the space surrounded by the peripheral wall portion and the oil pan.

(3) The above embodiment has been described with respect to an example in which the case-side intake oil passage 51 is connected to the main intake oil passage 21 and the case-side discharge oil passage 52 is connected to the main discharge oil passage 22. However, embodiments of the present invention are not limited to this. Thus, it is also one of preferred embodiments of the present invention that the case-side intake oil passage 51 be connected to the oil passage control device 12 without through the main intake oil passage 21, and the case-side discharge oil passage 52 be connected to the hydraulic pressure control device 12 without through the main discharge oil passage 22.

(4) The above embodiment has been described with respect to an example in which all the fastening holes 53, which are provided in the pump mounting wall 50 to mount the electric pump 70, are processed fastening holes formed by the drilling process. However, embodiments of the present invention are not limited to this. Thus, it is also one of preferred embodiments of the present invention that some of the fastening holes 53 provided in the pump mounting wall 50 to mount the electric pump 70 be a processed fastening hole, and some of the remainder of the fastening holes 53 be a cored fastening hole formed by coring. In this case as well, it is preferable that a processed fastening hole and a processed oil passage be provided so as not to overlap each other in a direction perpendicular to the direction in which the pump mounting wall 50 protrudes from the case main body portion 20.

(5) The above embodiment has been described with respect to an example in which the electric pump 70 is positioned so as to entirely overlap the connection case portion 30 in a top view from above the case 3. However, embodiments of the present invention are not limited to this. Thus, it is also one of preferred embodiments of the present invention that the electric pump 70 be positioned so as to only partially overlap the connection case portion 30 in a top view. Even in this arrangement, the interference of the electric pump 70 with other parts, such as a vehicle frame and an exhaust pipe, can be suppressed, as long as the electric pump 70 does not protrude significantly laterally in the width direction (the lateral direction) from the connection case portion 30, whereby mountability to vehicles can be assured.

(6) The above embodiment has been described with respect to an example in which the ribs 31 are provided on both outer sides of the electric pump 70 in the width direction of the case 3. However, embodiments of the present invention are not limited to this. It is also one of preferred embodiments of the present invention that the connection case portion 30 have no such ribs 31. In this case as well, the electric pump 70 is covered at least in the longitudinal direction by the large diameter portion of the connection case portion 30 and the pump mounting wall 50. Thus, the electric pump 70 can be appropriately protected even if the electric pump 70 is provided under the vehicle drive device 1, that is, the location that tends to be affected by an external environment.

(7) The above embodiment has been described with respect to an example in which the case main body portion 20 and the connection case portion 30 are formed to be separable from each other. However, embodiments of the present invention are not limited to this. It is also one of preferred embodiments of the present invention that the case main body portion 20 and the connection case portion 30 be formed integrally. In this case, it is also preferable that the skirt portion 40 be formed so as to be separable from the case main body portion 20 and the connection case portion 30. Moreover, in the structure in which the case main body portion 20 and the connection case portion 30 are separable from each other as in the above embodiment, it is also preferable that the skirt portion 40 be formed so as to be separable from the case main body portion 20.

The present invention is preferably used for a vehicle drive device that includes a hydraulically operated speed change mechanism, is connected to an engine for use, and includes an electric pump that generates a hydraulic pressure to be supplied to the speed change mechanism.

What is claimed is:

1. A vehicle drive device including a hydraulically operated speed change mechanism, and connected to an engine for use, comprising:
a case including a case main body portion accommodating the speed change mechanism, and a connection case portion connecting the engine and the case main body portion and having a diameter increased toward the engine and accommodating at least one of a torque converter, a damper and a rotating electrical machine;
a hydraulic pressure control device that is provided under the speed change mechanism, and controls a hydraulic pressure to be supplied to the speed change mechanism; and
an electric pump that generates the hydraulic pressure to be supplied to the speed change mechanism through the hydraulic pressure control device, wherein
the case main body portion includes a peripheral wall portion that protrudes downward from the case main body portion so as to surround a periphery of the hydraulic pressure control device, and a wall on the engine side of the peripheral wall portion serves as a pump mounting wall on which the electric pump is mounted, and
a case-side intake oil passage that is connected to a pump-side intake oil passage of the electric pump, and a case-side discharge oil passage that is connected to a pump-side discharge oil passage of the electric pump are provided in the pump mounting wall.

2. The vehicle drive device according to claim 1, wherein
a mechanical pump that is driven by a driving force of the engine is provided in the case,
a main intake oil passage and a main discharge oil passage, which connect the mechanical pump and the hydraulic pressure control device, are provided in the case main body portion, and
the case-side intake oil passage is connected to the main intake oil passage, and the case-side discharge oil passage is connected to the main discharge oil passage.

3. The vehicle drive device according to claim 1, wherein the electric pump is positioned so as to overlap the case when viewed from above the case.

4. The vehicle drive device according to claim 1, wherein ribs, which are provided on both outer sides of the electric pump in a width direction of the case and extend in a direction crossing the pump mounting wall, are formed so as to protrude downward from the connection case portion.

5. The vehicle drive device according to claim 1, wherein the electric pump is structured so as to be fixedly fastened to the pump mounting wall by one or more fastening members, and one or more fastening holes in which the fastening members are fastened are provided in the pump mounting wall, and
at least one of the fastening holes is a processed fastening hole formed by performing a drilling process in the pump mounting wall, and one or both of the case-side intake oil passage and the case-side discharge oil passage are a processed oil passage formed by performing the drilling process in the pump mounting wall, and
the processed fastening hole and the processed oil passage are positioned so as not to overlap each other in a direction perpendicular to a direction in which the pump mounting wall protrudes from the case main body portion in a wall plane of the pump mounting wall.

6. The vehicle drive device according to claim 5, wherein a thin portion having a smaller thickness than a thickness of a remaining portion of the pump mounting wall is formed between the processed fastening hole and the processed oil passage in the direction perpendicular to the direction in which the pump mounting wall protrudes from the case main body portion.

7. The vehicle drive device according to claim 1, wherein the case main body portion and the connection case portion are formed so as to be separable from each other.

8. The vehicle drive device according to claim 2, wherein the electric pump is positioned so as to overlap the case when viewed from above the case.

9. The vehicle drive device according to claim 8, wherein ribs, which are provided on both outer sides of the electric pump in a width direction of the case and extend in a direction crossing the pump mounting wall, are formed so as to protrude downward from the connection case portion.

10. The vehicle drive device according to claim 9, wherein the electric pump is structured so as to be fixedly fastened to the pump mounting wall by one or more fastening members, and one or more fastening holes in which the fastening members are fastened are provided in the pump mounting wall, and
at least one of the fastening holes is a processed fastening hole formed by performing a drilling process in the pump mounting wall, and one or both of the case-side intake oil passage and the case-side discharge oil passage are a processed oil passage formed by performing the drilling process in the pump mounting wall, and
the processed fastening hole and the processed oil passage are positioned so as not to overlap each other in a direction perpendicular to a direction in which the pump mounting wall protrudes from the case main body portion in a wall plane of the pump mounting wall.

11. The vehicle drive device according to claim 10, wherein
a thin portion having a smaller thickness than a thickness of a remaining portion of the pump mounting wall is formed between the processed fastening hole and the processed oil passage in the direction perpendicular to the direction in which the pump mounting wall protrudes from the case main body portion.

12. The vehicle drive device according to claim 2, wherein ribs, which are provided on both outer sides of the electric pump in a width direction of the case and extend in a direction crossing the pump mounting wall, are formed so as to protrude downward from the connection case portion.

13. The vehicle drive device according to claim 3, wherein ribs, which are provided on both outer sides of the electric pump in a width direction of the case and extend in a direction crossing the pump mounting wall, are formed so as to protrude downward from the connection case portion.

14. The vehicle drive device according to claim 2, wherein the electric pump is structured so as to be fixedly fastened to the pump mounting wall by one or more fastening members, and one or more fastening holes in which the fastening members are fastened are provided in the pump mounting wall, and at least one of the fastening holes is a processed fastening hole formed by performing a drilling process in the pump mounting wall, and one or both of the case-side intake oil passage and the case-side discharge oil passage are a processed oil passage formed by performing the drilling process in the pump mounting wall, and the processed fastening hole and the processed oil passage are positioned so as not to overlap each other in a direction perpendicular to a direction in which the pump mounting wall protrudes from the case main body portion in a wall plane of the pump mounting wall.

15. The vehicle drive device according to claim 3, wherein the electric pump is structured so as to be fixedly fastened to the pump mounting wall by one or more fastening members, and one or more fastening holes in which the fastening members are fastened are provided in the pump mounting wall, and at least one of the fastening holes is a processed fastening hole formed by performing a drilling process in the pump mounting wall, and one or both of the case-side intake oil passage and the case-side discharge oil passage are a processed oil passage formed by performing the drilling process in the pump mounting wall, and the processed fastening hole and the processed oil passage are positioned so as not to overlap each other in a direction perpendicular to a direction in which the pump mounting wall protrudes from the case main body portion in a wall plane of the pump mounting wall.

16. The vehicle drive device according to claim 4, wherein the electric pump is structured so as to be fixedly fastened to the pump mounting wall by one or more fastening members, and one or more fastening holes in which the fastening members are fastened are provided in the pump mounting wall, and at least one of the fastening holes is a processed fastening hole formed by performing a drilling process in the pump mounting wall, and one or both of the case-side intake oil passage and the case-side discharge oil passage are a processed oil passage formed by performing the drilling process in the pump mounting wall, and the processed fastening hole and the processed oil passage are positioned so as not to overlap each other in a direction perpendicular to a direction in which the pump mounting wall protrudes from the case main body portion in a wall plane of the pump mounting wall.

17. The vehicle drive device according to claim 8, wherein the electric pump is structured so as to be fixedly fastened to the pump mounting wall by one or more fastening members, and one or more fastening holes in which the fastening members are fastened are provided in the pump mounting wall, and at least one of the fastening holes is a processed fastening hole formed by performing a drilling process in the pump mounting wall, and one or both of the case-side intake oil passage and the case-side discharge oil passage are a processed oil passage formed by performing the drilling process in the pump mounting wall, and the processed fastening hole and the processed oil passage are positioned so as not to overlap each other in a direction perpendicular to a direction in which the pump mounting wall protrudes from the case main body portion in a wall plane of the pump mounting wall.

\* \* \* \* \*